United States Patent
Abe et al.

(10) Patent No.: US 7,954,873 B2
(45) Date of Patent: Jun. 7, 2011

(54) LOCK STRUCTURES FOR STOWABLE VEHICLE SEATS

(75) Inventors: Tetsuya Abe, Aichi-ken (JP); Takahiro Sugama, Aichi-ken (JP); Masami Natsume, Nagoya (JP); Yasuhiro Nishii, Okazaki (JP)

(73) Assignees: Toyota Boshoku Kabushiki Kaisha, Aichi (JP); Toyota Shatai Kabushiki Kaisha, Aichi (JP)

( * ) Notice: Subject to any disclaimer, the term of this patent is extended or adjusted under 35 U.S.C. 154(b) by 0 days.

(21) Appl. No.: 12/527,740

(22) PCT Filed: Oct. 12, 2007

(86) PCT No.: PCT/JP2007/069945
§ 371 (c)(1),
(2), (4) Date: Sep. 17, 2009

(87) PCT Pub. No.: WO2008/105120
PCT Pub. Date: Sep. 4, 2008

(65) Prior Publication Data
US 2010/0117425 A1    May 13, 2010

(30) Foreign Application Priority Data

Feb. 27, 2007 (JP) ................................ 2007-046994

(51) Int. Cl.
*B60N 2/14* (2006.01)
(52) U.S. Cl. ................ 296/65.05; 296/65.09; 296/65.16; 297/14
(58) Field of Classification Search ............... 296/65.05, 296/65.09, 65.16; 297/14
See application file for complete search history.

(56) References Cited

U.S. PATENT DOCUMENTS

| 5,342,103 | A  |   | 8/1994  | Tame et al.    |          |
|-----------|----|---|---------|----------------|----------|
| 6,460,929 | B2 | * | 10/2002 | Kamida ........ | 297/344.1|
| 6,843,526 | B2 | * | 1/2005  | Honda et al. ..... | 297/14 |
| 7,658,430 | B2 | * | 2/2010  | Zielinski et al. ........ | 296/65.16 |
| 2009/0056393 | A1 | | 3/2009 | Otsuka         |          |
| 2009/0126520 | A1 | | 5/2009 | Yamaguchi et al. |       |
| 2009/0167068 | A1 | | 7/2009 | Yamagishi      |          |

FOREIGN PATENT DOCUMENTS

| FR | 2849629      | 7/2004 |
| JP | 63-19226     | 5/1988 |
| JP | 2005-59737   | 3/2005 |
| JP | 2005-263007  | 9/2005 |
| JP | 2006-137265  | 6/2006 |

OTHER PUBLICATIONS

Search report from E.P.O., mail date is Jan. 11, 2011.
Search report from E.P.O., mail date is Jan. 11, 2011.
English language Abstract of JP 2006-137265, Jun. 1, 2006.
English language Abstract of JP 2005-59737, Mar. 10, 2005.
English language Abstract of JP 2005-263007, Sep. 29, 2005.

* cited by examiner

*Primary Examiner* — Dennis H Pedder
(74) *Attorney, Agent, or Firm* — Greenblum & Bernstein, P.L.C.

(57) ABSTRACT

A striker is supported by and coupled to a seat body and is held in a rotated position where the striker is lowered to a position along the shape of the seat body. When the seat body is moved and stowed, the striker is raised to and held at a rotated and raised position where the striker can be engaged and locked to a locking device. Elasticity of an opening spring and a rubber body, which are arranged between the striker and a coupling section, allows a forced rotational displacement of the striker in both forward and reverse directions from a state in which the striker is held at the rotated and raised position.

7 Claims, 10 Drawing Sheets

LOCK STRUCTURES FOR STOWABLE VEHICLE SEATS

TECHNICAL FIELD

The present invention relates to a lock structure for a stowable vehicle seat. Specifically, the present invention relates to a lock structure for a stowable vehicle seat capable of locking a seat body, which is a seating portion, to a vehicle body in an engaging/disengaging manner at a moved and stowed position.

BACKGROUND ART

Conventionally, a sitting seat of a vehicle in which a seat body is moved and stowed so that an installation space thereof can be made available as a loading space is known. Specifically, a mode of moving and stowing the seat body includes a mode of flipping up and raising the seat body from a floor surface toward its side. In this case, the seat body is engaged and locked in a flipped-up state by a lock structure provided between the seat body and a vehicle body side panel, toward which the seat body is flipped up.

Japanese Laid-Open Patent Publication No. 2005-263007 discloses a technology related to a lock structure for engaging and locking the seat body to the vehicle body side panel. The lock structure has a configuration in which a frame-shaped striker fixed and installed on the seat body or the vehicle body side panel is pushed into a locking device, which acts as the counterpart, whereby the striker and the locking device are engaged and locked to each other. In this disclosure, the striker has an elastically supported configuration so as to be able to perform an oscillating motion, whereby the relative shift in the push-in position with respect to the locking device can be corrected by the oscillating motion.

Thus, there is a need in the art to improve the conventional lock structure for a stowable vehicle seat described above.

SUMMARY

That is, a lock structure for a stowable vehicle seat of the present invention provides a configuration for locking a seat body serving as a seating portion to a vehicle body in an engaging/disengaging manner at a moved and stowed position. The lock structure for a stowable vehicle seat comprises an engagement member provided on the seat body; and an engaging member, provided on the vehicle body, to be engaged and locked to the engagement member. The engagement member is pushed-in to engage and lock to the engaging member when the seat body is moved and stowed. The engagement member is raisably and rotatably supported by and coupled to the seat body, and is usually held in a rotated position where the engagement member is lowered to a position along a shape of the seat body. However, the engagement member is raised to and held at a rotated and raised position of engaging and locking to the engaging member by an operation mechanism provided between the engagement member and the seat body when the seat body is moved and stowed. An operation path in which the engagement member is raisably and rotatably operated by the operation mechanism is provided with a deformation allowing mechanism for allowing rotation in both forward and reverse directions of the engagement member held at the rotated and raised position with elastic deformation. The deformation allowing mechanism includes a coupling mechanism for rotatably supporting and coupling an engagement portion, the engagement portion engaging to the engaging member and formed in the engagement member, with respect to a coupling section coupled with the operation mechanism; and an elastic body for holding the rotated position of the engagement portion with respect to the coupling section by an elastic force. The engagement portion is allowed to rotate in both forward and reverse directions with respect to the coupling section with elastic deformation of the elastic body.

According to the configuration of the present invention, the engagement member provided on the seat body is raised to and held at the rotated and raised position where the engagement member may engage and lock to the engaging member by the operation mechanism when the seat body is moved and stowed. In this case, the engagement member has the engagement portion engaging the engaging member rotatable against the elastic force of the elastic body with respect to the coupling section coupled with the operation mechanism. Therefore, when a relative shift in the push-in position occurs between the engagement member held at the rotated and raised position and the engaging member, the shift in the push-in position described above can be corrected for both forward and reverse directions by rotatably displacing the engagement portion against the elastic force of the elastic body. The structure for correcting the shift of the push-in position described above also effectively acts as a structure for absorbing a positional shift that occurs by an influence of vibration and the like while the vehicle is traveling even when the engagement member and the engaging member are engaged and locked.

Further, the present invention may employ the following configuration. That is, the elastic body for holding the rotated position of the engagement portion of the engagement member with respect to the coupling section by the elastic force includes: a spring member for biasing the engagement portion in one rotating direction with respect to the coupling section; and an elastic stopper provided between the engagement portion and the coupling section as a stopper for elastically receiving biasing rotation of the engagement portion by the spring member. The engagement portion is regulated at the rotated position at which the rotation by the biasing of the spring member is usually elastically received by the elastic stopper. The movement in one rotating direction of the engagement portion is allowed by a deflecting deformation of the elastic stopper in which the elastic stopper is squashed against the elastic force thereof. The movement in another rotating direction of the engagement portion is allowed by a deflecting deformation of the spring member against the elastic force thereof.

According to the configuration of the present invention, the engagement portion of the engagement member is usually held at the rotated position where the rotation by the biasing of the spring member is elastically received by the elastic stopper provided between the engagement portion and the coupling section. In other words, the rotated position of the engagement portion with respect to the coupling section is held at a position where the elastic force of the spring member and the elastic force of the elastic stopper are balanced with respect to each other. From such state, the movement in one rotating direction of the engagement portion is allowed by the movement of squashing and deflecting deforming the elastic stopper. The movement in the other rotating direction of the engagement portion is allowed by the movement of deflecting deforming the spring member against its elastic force.

Further, the present invention may employ the following configuration. That is, the engagement portion of the engagement member is configured by a frame-shaped striker. The engaging member is configured by a locking device provided with an actuating structure which engages and locks to the striker by a movement of receiving the frame-shaped striker therein.

According to the configuration of the present invention, the configuration is simplified compared to the configuration of raisably rotating the locking device by having the engagement member raisably and rotatably provided at the seat body as a frame-shaped striker. For instance, with the configuration of raisably rotating the locking device, a wide space for accommodating the locking device in the seat-shaped interior is necessary. A mechanism for raisably rotating the locking device also becomes large scale.

Further, the present invention may employ the following configuration. That is, the seat body has a stowable structure of being flipped up toward the side of the vehicle body from a using position provided on a vehicle floor to be engaged and locked to and held at a vehicle body side wall panel toward which the seat body is flipped up.

According to the configuration of the present invention, a space where the seat body is installed becomes available as a loading space by flipping up the seat body toward the side from the floor of the vehicle.

BEST MODE FOR CARRYING OUT THE INVENTION

Hereinafter, embodiments of the best mode for carrying out the present invention are described with reference to the drawings.

First Embodiment

Figure 1:
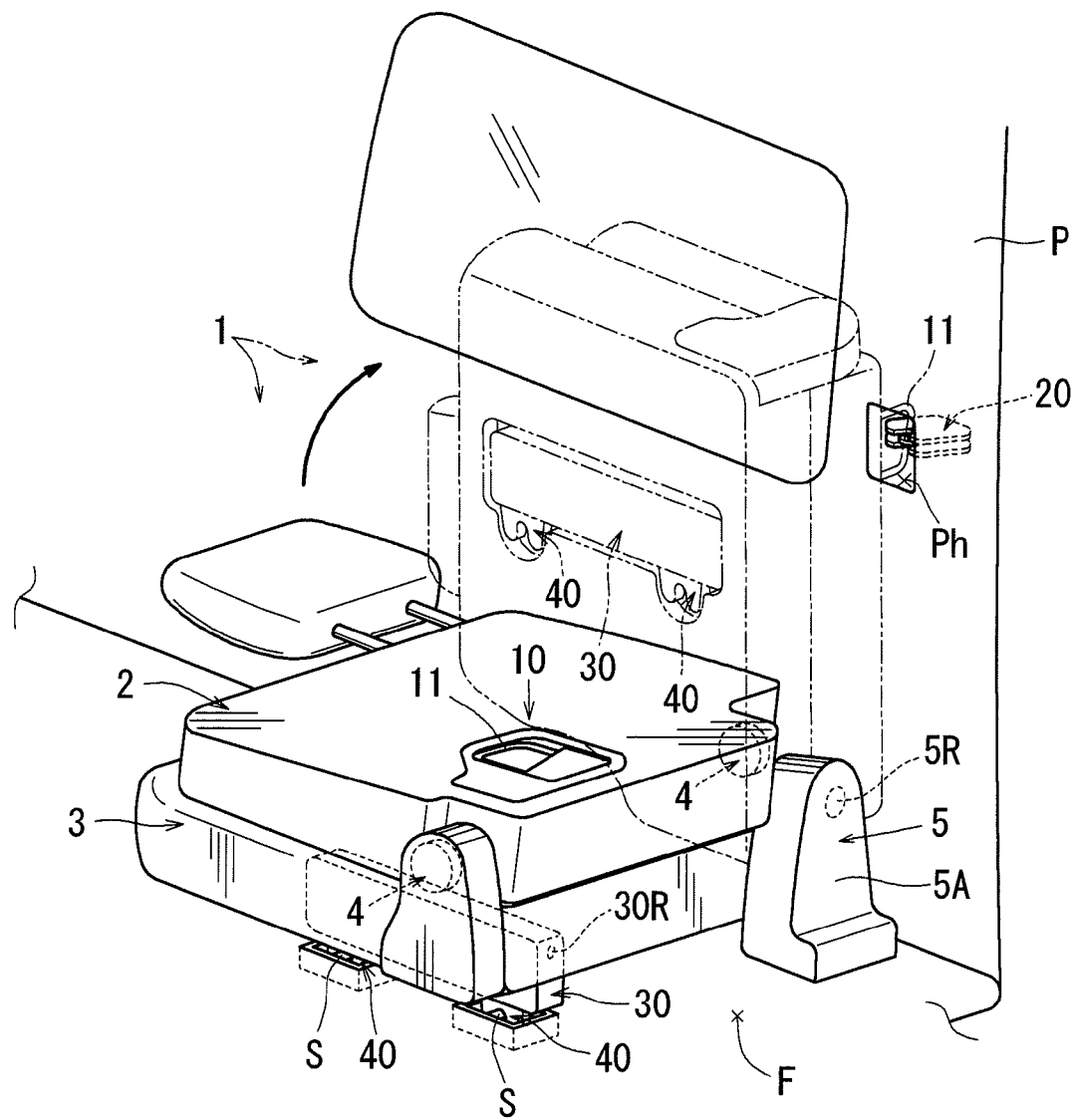
FIG. 1 is a perspective view illustrating a schematic configuration of a lock structure for a stowable vehicle seat.

First, a lock structure for a stowable vehicle seat (hereinafter referred to as lock structure) of a first embodiment is described with reference to FIGS. 1 to 10. As illustrated in FIG. 1, the lock structure is provided on a seat body 1 arranged as a rear row seat on a floor F of a vehicle. The seat body 1 includes a seat back 2 constituting a back rest, and a seat cushion 3 constituting a seating portion.

The seat back 2 has the lower ends on both sides coupled to the seat cushion 3 through a reclining device 4, which is a rotation restriction device. Herein, the reclining device 4 is usually biased in the actuating direction to be in the locked state, and the backrest angle of the seat back 2 is fixed. The locked state of the reclining device 4 described above is released by performing the release operation of a release lever (not shown).

Herein, although not shown, a bias spring for biasing the seat back 2 usually in the forward rotating direction is hooked between the seat back 2 and the seat cushion 3. The seat back 2 then can be lowered forward onto an upper surface portion of the seat cushion 3 by performing the above-mentioned release operation of the release lever without a passenger seated on the seat body 1. Note that the basic configuration of the reclining device 4 described above is a well-known configuration disclosed in the document of Japanese Laid-Open Patent Publication No. 2002-360368, and thus the detailed description thereof is omitted.

The seat body 1 has a portion on the left side in the figure of the seat cushion 3 engaged and locked to the floor F by a pair of front and back floor locking devices 40, to be hereinafter described, when being used for seating. A portion on the right side in the figure of the seat cushion 3 is supported by and coupled to the floor F so as to be raisable and rotatable toward the side of the vehicle by a tumble device 5. Herein, the floor locking device 40 is held in a state engaged and locked to a striker S fixed and installed on the floor F when the seat body 1 is used for seating. The engaged and locked state of the floor locking device 40 with respect to the striker S is released by performing the release operation of a release lever (not shown).

Herein, although not shown, the tumble device 5 is hooked with a bias spring, which always biases the seat cushion 3 in the flip-up rotating direction. Therefore, when the above-mentioned release operation of the release lever is performed, the seat body 1 is flipped up from the floor F toward the side of the vehicle by biasing with the seat back 2 lowered forward to a folded posture. The seat body 1 flipped up toward the side of the vehicle is engaged and locked by a locking device 20 provided on an interior panel P (vehicle body side wall panel) toward which the seat body 1 is flipped up, and is held in the flipped-up state.

The seat body 1 then can be held in the moved and stowed state so that a space where the seat body 1 is installed becomes widely available as a loading space. Hereinafter, a coupling structure of the seat body 1 with respect to the floor F, and a structure for holding the seat body 1 in a stowed position at which the seat body 1 is flipped up toward the side of the vehicle are described in detail below.

A supporting plate 30 that acts as a vertical plate to support the seat cushion 3 with respect to the floor F is provided at the lower surface portion on the left side in the figure of the seat cushion 3. The supporting plate 30 has the upper end raisably and rotatably supported by and coupled to a skeletal frame of the seat cushion 3 (not shown) by a coupling shaft 30R. Therefore, the supporting plate 30 can change the posture between a raised posture of being straightly dropped from the lower surface portion of the seat cushion 3 and a folded posture of being folded along the shape of the lower surface portion of the seat cushion 3.

Although not shown, the supporting plate 30 is usually held in the raised posture to function as the vertical plate by the biasing force of the bias spring hooked between the supporting plate 30 and the skeletal frame of the seat cushion 3. Although similarly not shown, the supporting plate 30 is pulled in the direction of folding along the shape of the lower surface portion of the seat cushion 3 with the movement of raising the seat body 1 from the floor F.

The supporting plate 30 is thus held in the state folded along the shape of the lower surface portion of the seat cushion 3 when the seat body 1 is flipped up to the stowed position. The supporting plate 30 is gradually raised toward the lower side from the seat cushion 3 by biasing with the movement of fitting the seat body 1 into the using position on the floor F from the stowed position. The supporting plate 30 is thus in the raised state straightly dropped from the lower surface portion of the seat cushion 3 when the seat body 1 is fitted into the using position on the floor F.

The floor locking device 40 is arranged at the lower end of the supporting plate 30 at two positions on the front and the back thereof. The floor locking device 40 includes a configuration of engaging and disengaging the striker S arranged at two positions on the front and the back on the floor F. Specifically, the floor locking device 40 has an actuating structure of engaging and locking to the striker S while being pushed into the striker S according to the movement of fitting the seat body 1 onto the floor F.

The engaged and locked state of the floor locking device 40 is released by operating the release lever (not shown) described above. The basic configuration of the floor locking device 40 is a well-known configuration disclosed in the document of Japanese Laid-Open Patent Publication No. 2005-7916 and the like, and thus the detailed description thereof is omitted.

The tumble device 5 for raisably and rotatably supporting and coupling the seat cushion 3 to the floor F is provided at the lower surface portion on the right side in the figure of the seat cushion 3. The tumble device 5 has a configuration in which the skeletal frame of the seat cushion 3 (not shown) is rotatably supported by and coupled to a fixed body 5A fixed and installed on the floor F by a coupling shaft 5R. The seat body 1 is thus raisable and rotatable between the using position at which the seat cushion 3 is lowered onto the floor F and the stowed position at which the seat cushion 3 is raised perpendicularly from the floor F.

Figure 4:
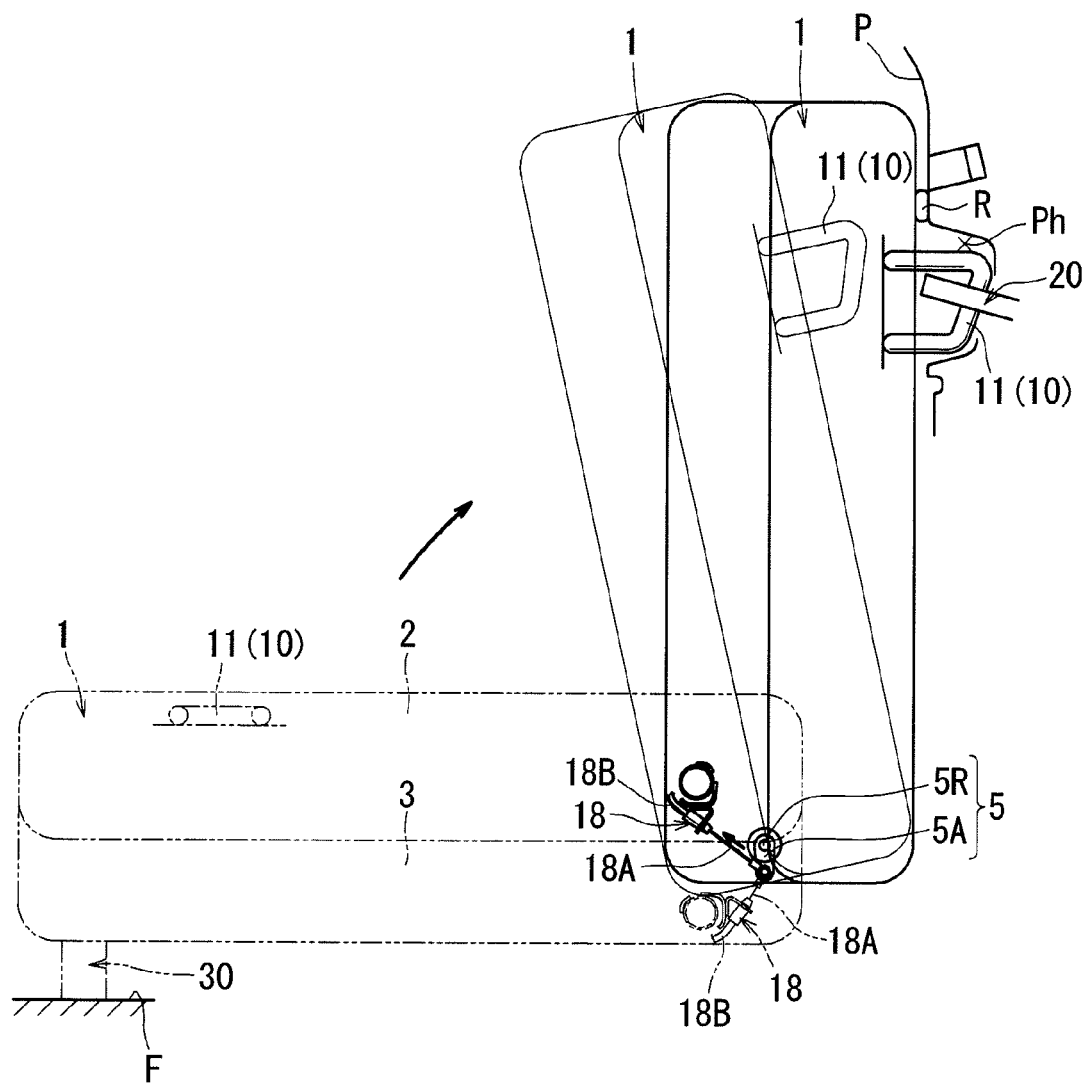
FIG. 4 is a schematic view illustrating a stowing movement of flipping up a seat body toward the side from a using position on a vehicle floor.

As illustrated in FIG. 4, a buffer rubber R is installed on the interior panel P on the side of the vehicle body side wall toward which the seat body 1 is flipped up. The momentum movement when the seat body 1 is raised toward the interior panel P by biasing is gently received by the buffer rubber R.

Figure 2:
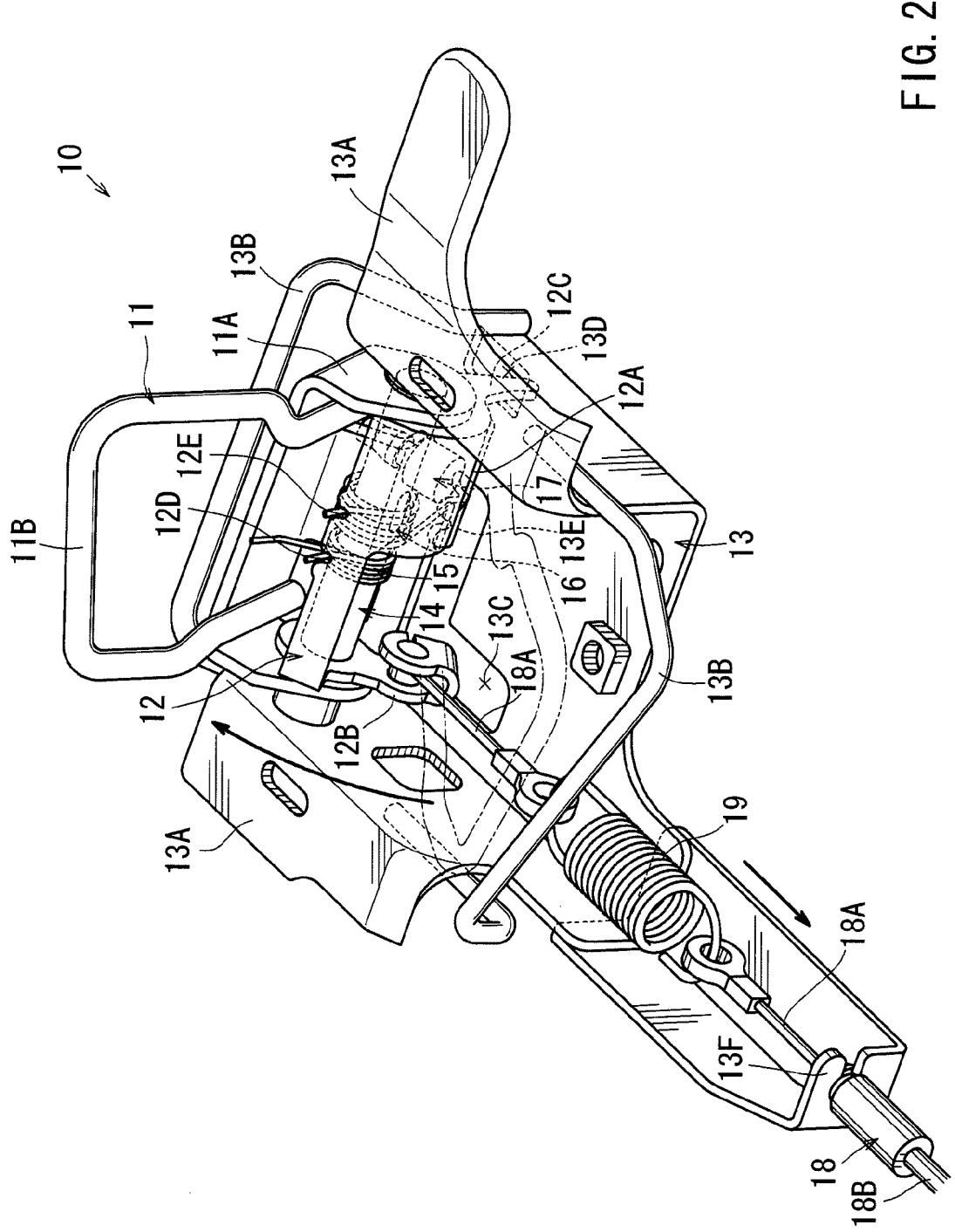
FIG. 2 is a perspective view illustrating a raising/lowering device for raisably rotating a striker in an enlarged manner.
Figure 3:
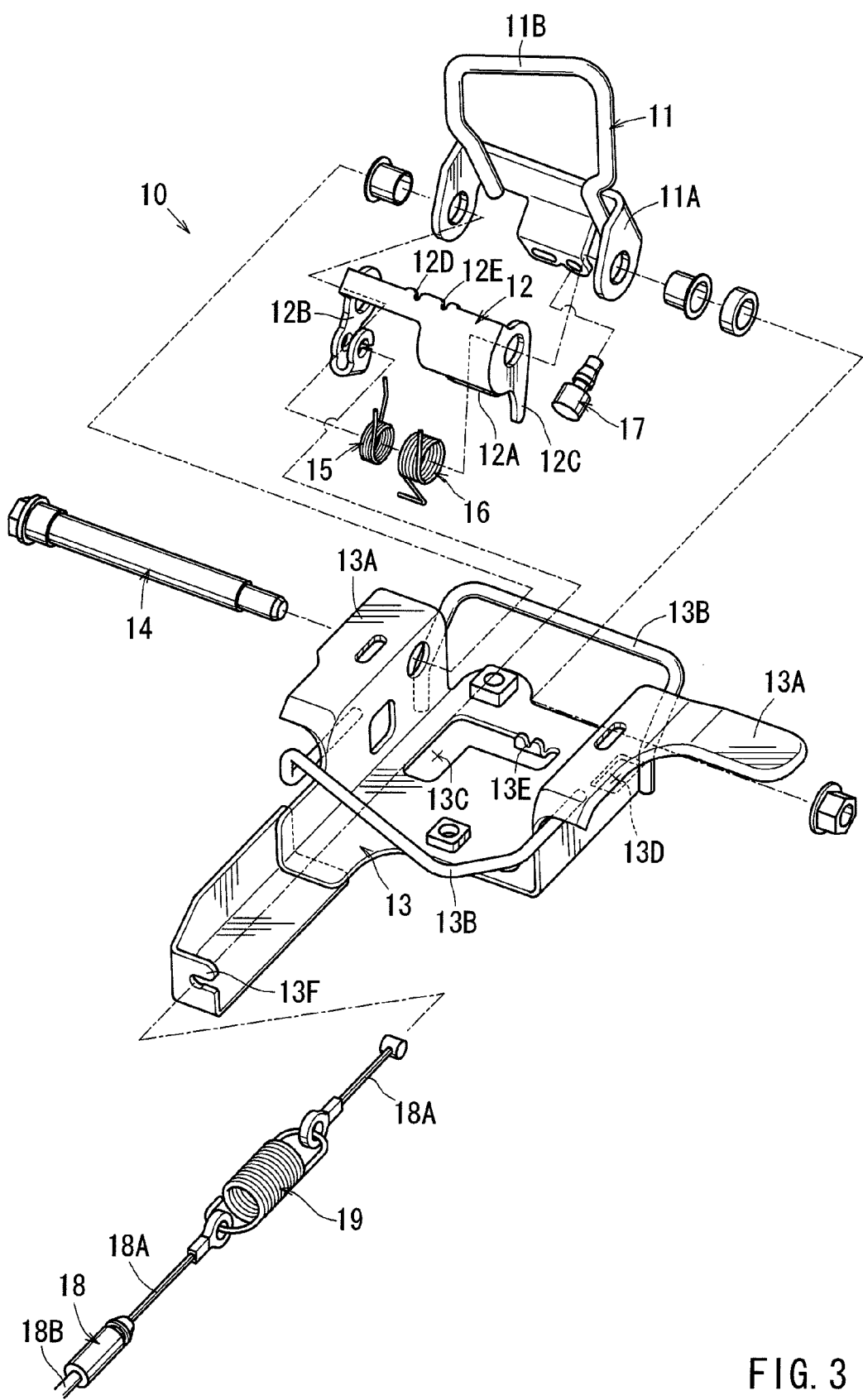
FIG. 3 is an exploded perspective view of the raising/lowering device.

Referring back to FIG. 1, a striker 11 that engages and locks to the locking device 20 provided on the interior panel P when the seat body 1 is moved and stowed is provided at the rear surface portion of the seat back 2. As illustrated in FIG. 2 and FIG. 3, the striker 11 is provided to be raisable and rotatable with respect to the seat back 2 by a raising/lowering device 10. Specifically, as illustrated in FIG. 4, the raising/lowering device 10 holds the striker 11 in a state folded along the shape of the rear surface portion of the seat back 2 when the seat body 1 is at the using position on the floor F.

The raising/lowering device 10 raises the striker 11 from the rear surface portion of the seat back 2 with the movement of raising the seat body 1 from the floor F, and holds the striker 11 in a raised state. Thus, the striker 11 transitions to a raised posture at which it can engage and lock to the locking device 20 provided on the interior panel P when the seat body 1 is moved and stowed. The raising/lowering device 10 gradually folds the striker 11 along the shape of the rear surface portion of the seat back 2 with the movement of fitting the seat body 1 into the using position on the floor F from the stowed position. The striker 11 is thus held in an accommodated state so as not to project out from the shape of the seat back 2 when the seat body 1 is fitted at the using position on the floor F.

As illustrated in FIG. 3, the raising/lowering device 10 is configured by the striker 11, a coupling section 12, a base plate 13, a coupling shaft 14, an opening spring 15, a lowering spring 16, a rubber body 17, an operation cable 18, and a tension spring 19. Herein, the opening spring 15 serves as the spring member of the present invention, the rubber body 17 serves as the elastic stopper of the present invention, and the operation cable 18 serves as the operation mechanism of the present invention.

Specifically, the striker 11 has a configuration in which an engagement frame 11B, which constitutes an engagement portion with the locking device 20, is integrally coupled to a supporting body 11A formed by folding a plate material to a "horseshoe" shape. The striker 11 is rotatably supported by and coupled to the base plate 13 by passing and inserting the coupling shaft 14 inserted from the base plate 13 to both side plates of the supporting body 11A. The supporting body 11A is attached with the elastically deformable rubber body 17 having flexibility.

Figure 5:
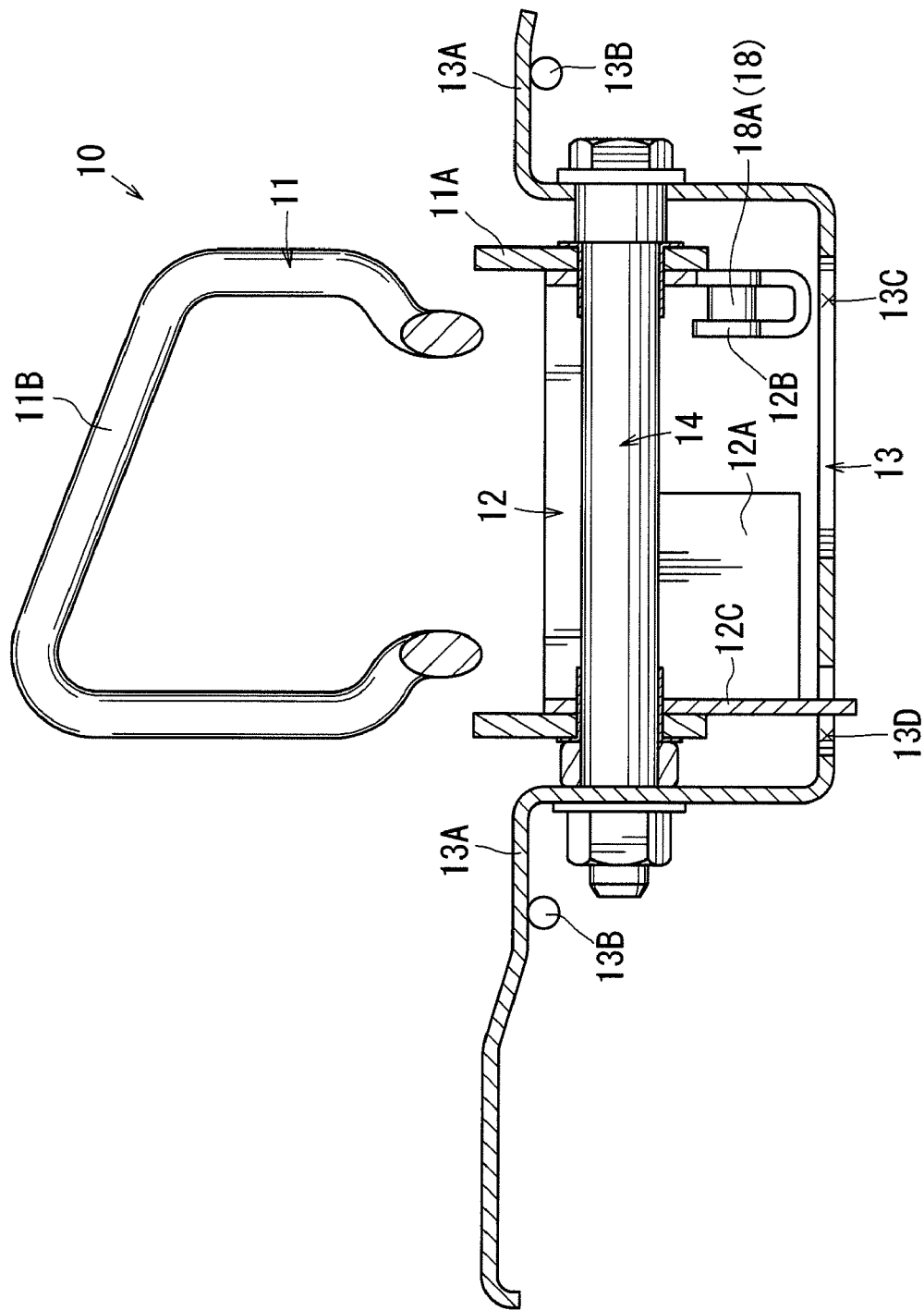
FIG. 5 is a longitudinal cross-sectional view of the raising/lowering device.

The coupling section 12 is formed to a shape in which the plate material is bent to a "horseshoe" shape. As illustrated in FIG. 5, the coupling section 12 is rotatably supported by and coupled to the base plate 13 by passing and inserting the coupling shaft 14 to both side plates with both side portions of the striker 11 described above sandwiched between both the bent side plates of the coupling section 12. Referring back to FIG. 3, the coupling section 12 is provided with a receiving piece 12A capable of contacting and receiving the rubber body 17 attached to the striker 11 described above.

The receiving piece 12A elastically receives the movement of the striker 11 by contacting the rubber body 17 when the striker 11 relatively rotates in a direction (clockwise direction) of lowering to the far side in the figure with respect to the coupling section 12. The bent side plate on the left side in the figure of the coupling section 12 is configured as a hook portion 12B for hooking an end of an inner cable 18A of the operation cable 18 having double structure, to be hereinafter described. The bent side plate on the right side in the figure of the coupling section 12 is configured as a stopper piece 12C for restricting the rotation in the clockwise direction in the figure of the coupling section 12.

Figure 6:
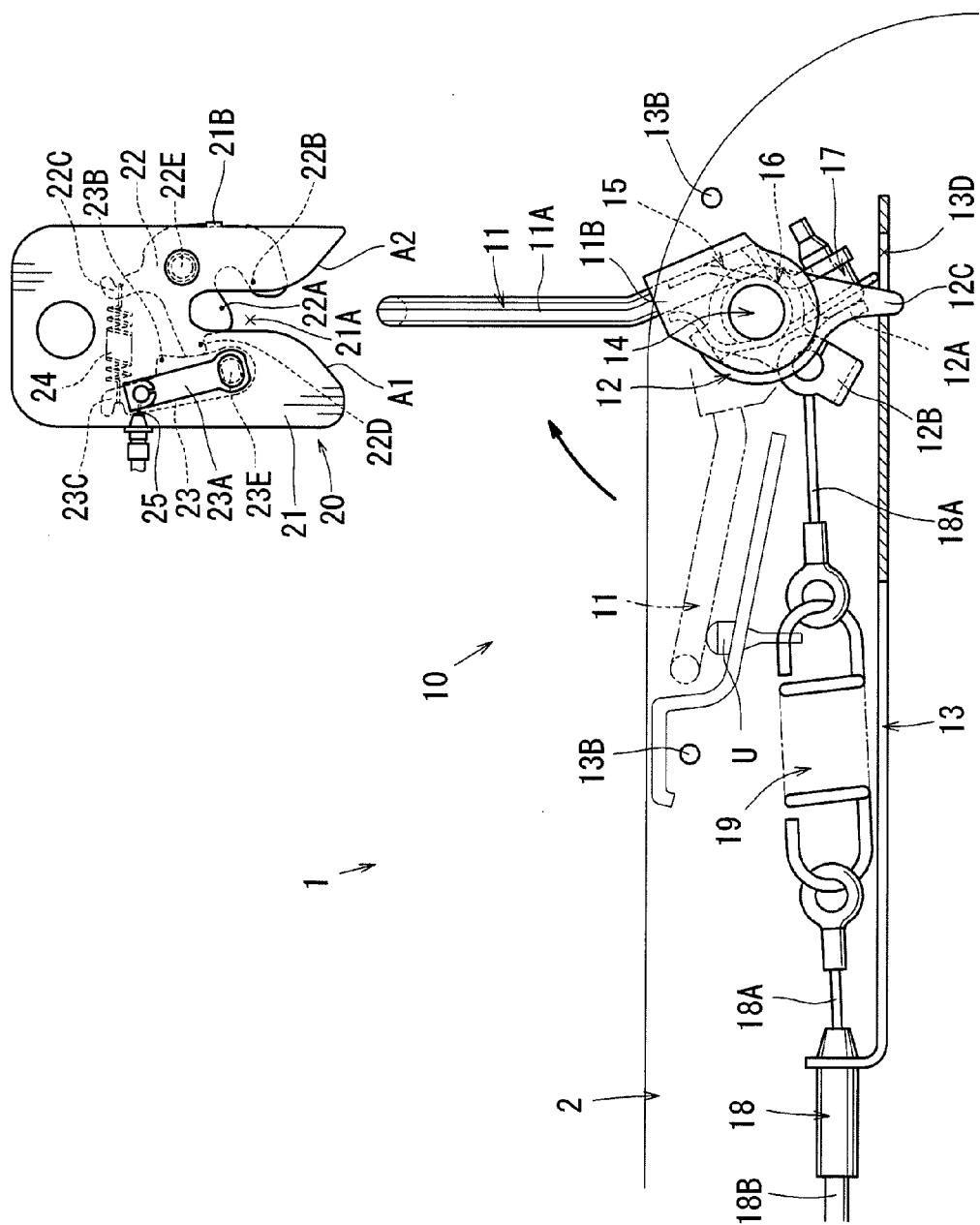
FIG. 6 is a configuration view illustrating a state in which the striker is raised to a rotated and raised position.

As illustrated in FIG. 6, the stopper piece 12C enters a reception hole 13D formed in the base plate 13 when the coupling section 12 is rotated in the clockwise direction in the figure. The stopper piece 12C locks the rotation of the coupling section 12 by contacting the edge of the reception hole 13D. Referring back to FIG. 3, the opening spring 15 including a torsion spring is hooked between the coupling section 12 and the striker 11. The opening spring 15 has one end hooked to a hook groove 12D formed at the upper edge of the coupling section 12, and the other end hooked to the supporting body 11A of the striker 11.

The opening spring 15 is assembled in a state of being twisted in advance such that the biasing force acts in a direction of separating the ends. The striker 11 is thus usually rotated and biased in the direction (clockwise direction) of lowering to the far side in the figure with respect to the coupling section 12 by the biasing force of the opening spring 15. Therefore, in relation to the coupling section 12, as illustrated in FIG. 6, the striker 11 has this posture with respect to the coupling section 12 while being elastically held at the rotated position at which the rubber body 17 (described above) is elastically received by the receiving piece 12A, that is, at the rotated position where the elastic forces of the rubber body 17 and the opening spring 15 are balanced with respect to each other.

Figure 8:
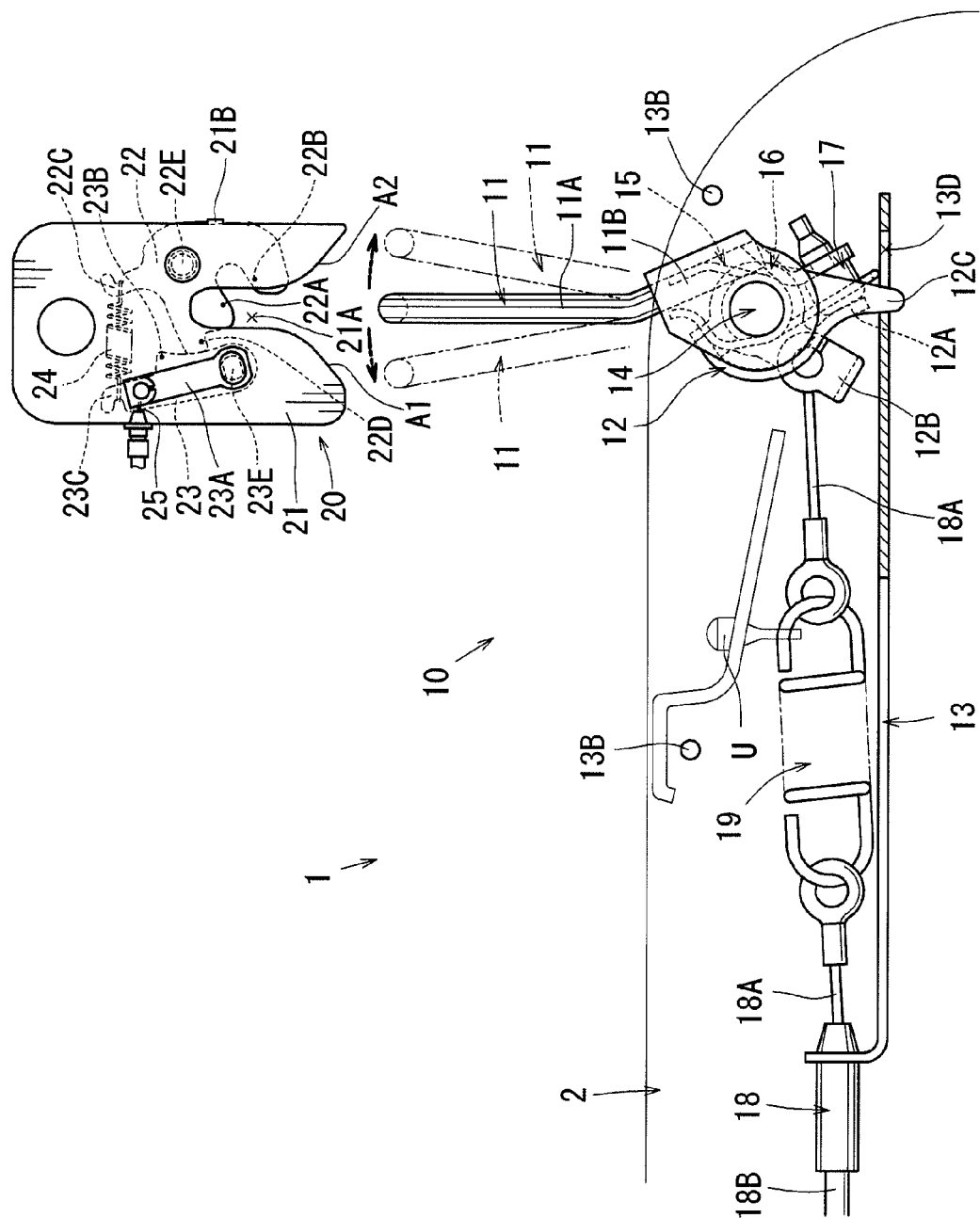
FIG. 8 is a configuration view illustrating a state in which the striker is rotatably displaced in both forward and reverse directions from the rotated and raised position.

The striker 11 thus rotates with the coupling section 12. Therefore, as illustrated in FIG. 6, the striker 11 is raised up to the rotated position at which it is raised straight from the rear surface portion of the seat back 2 when the coupling section 12 is rotationally operated in the clockwise direction in the figure up to the position where the stopper piece 12C and the edge of the reception hole 13D contact. As illustrated in FIG. 8, the striker 11 is allowed to perform the forced rotational movement in both forward and reverse directions against the elastic forces of the rubber body 17 and the opening spring 15 described above in the raised posture.

Referring back to FIG. 3, the lowering spring 16 including a torsion spring is hooked between the coupling section 12 and the base plate 13. The lowering spring 16 has one end hooked to a hook groove 12E formed at the upper edge of the coupling section 12, and the other end hooked to a hook groove 13E formed in the base plate 13. The lowering spring 16 is assembled in a state of being twisted in advance such that the biasing force acts in a direction of separating the ends. Thus, as illustrated in FIG. 6, the coupling section 12 is usually rotated and biased in the direction (counterclockwise direction) of lowering the striker 11 by the biasing force of the lowering spring 16.

Thus, the striker 11 is held at the rotated position where it is lowered to a position along the shape of the rear surface portion of the seat back 2 usually before the coupling section 12 is rotationally operated in the rising direction. Herein, a buffer rubber U is installed in a recess, to which the striker 11 is lowered, formed at the rear surface portion of the seat back 2. Thus, the momentum movement of the striker 11 lowered by the biasing force of the lowering spring 16 is gently received by the buffer rubber U.

The striker 11 held at the lowered position is raised by the pulling operation of the operation cable 18 coupled to the coupling section 12. As illustrated in FIG. 3, the operation cable 18 has a double cable structure in which a linear inner cable 18A is inserted inside a tubular outer cable 18B. The inner cable 18A has one end side hooked as illustrated and one end integrally fixed to the hook portion 12B of the coupling section 12 but is divided at the middle, where the tension spring 19 is interposed at the middle. Thus, the inner cable 18A has a configuration in which an elastically deformable elastic body (tension spring 19) is interposed in the transmission path of the operation force.

The outer cable 18B has one end side hooked as illustrated and one end integrally fixed to a hook portion 13F formed in the base plate 13. The outer cable 18B is arranged as a guiding member for guiding an arrangement path of the inner cable 18A. As illustrated in FIG. 4, the other end of the outer cable 18B is arranged at a position in the vicinity of the coupling shaft 5R which is the center of rotation of the tumble device 5 described above, and is hooked and integrally fixed to the skeletal frame of the seat cushion 3.

The other end of the inner cable 18A is pulled out from the other end of the outer cable 18B, and is supported by and coupled to the fixed body 5A of the tumble device 5 integrally fixed to the floor F. The coupling position of the other end of the inner cable 18A is set to a position decentered to the lower side in the figure from the position of the coupling shaft 5R of the tumble device 5. Thus, the other end of the inner cable 18A is pulled in a manner of being pulled out from the other end of the outer cable 18B with the movement of raising the seat body 1 from the using position on the floor F.

As illustrated in FIG. 6, when the inner cable 18A is pulled from the other end side, the coupling section 12 is rotationally operated in the clockwise direction in the figure integrally with the striker 11 against the biasing force of the lowering spring 16. Herein, the biasing force of the tension spring 19 is set stronger than the biasing force of the lowering spring 16 described above. The striker 11 is thus reliably raised to the rotated and raised position with the pulling operation of the inner cable 18A.

When the pulling operation amount of the inner cable 18A becomes large with respect to the rotational movement amount with which the striker 11 is raised, the tension spring 19 elastically stretching deforms to absorb the difference in the movement amount. The raising/lowering device 10 is thus not subjected to an abnormal load even if a difference occurs in the movement amount as described above. In this embodiment, the striker 11 is raised to the raised position by the pulling operation amount of the inner cable 18A up to when the seat body 1 is raised to the position in the middle of being moved and stowed as illustrated with a thin line in FIG. 4.

The extra pulling operation amount of the inner cable 18A that produces when the seat body 1 is further raised from the above-mentioned state is absorbed by the stretching deformation of the tension spring 19 described above. Next, referring back to FIG. 3, the base plate 13 is now described. The base plate 13 is formed to a shape in which the plate material is bent to a "horseshoe" shape. The base plate 13 has the coupling shaft 14, which rotatably supports and couples the striker 11 and the coupling section 12 described above, passed and inserted between both the bent side plates. A space for accommodating the striker 11 is thus formed in a region sandwiched between both the side plates of the base plate 13.

A flange-shaped supporting plate 13A that spreads in an in-plane direction of the rear surface portion of the seat back 2 is formed at the upper edge of both side plates of the base plate 13. The base plate 13 has a hard supporting wire 13B tensioned so as to bridge across both the side plates. The supporting plate 13A and the supporting wire 13B serve as a supporting member for preventing the skin material covered on the rear surface portion of the seat back 2 from dropping into the shape of the seat back 2.

An escape hole 13C is formed so as to pass through a bottom plate portion of the base plate 13. The escape hole 13C is configured to escape the arm-shaped hook portion 12B formed at the coupling section 12 so as not to interfere with the base plate 13 when the above-mentioned coupling section 12 rotates. The reception hole 13D is formed so as to pass through the bottom plate portion of the base plate 13. As described above, the reception hole 13D receives the arm-shaped stopper piece 12C formed at the coupling section 12 and restricts the rotation of the coupling section 12 when the stopper piece 12C contacts the edge thereof.

Next, referring back to FIG. 1, the configuration of the locking device 20 is described. The locking device 20 is arranged inside a recess Ph formed at the interior panel P on the vehicle body side wall side. The striker 11 in the raised posture enters the recess Ph when the seat body 1 is raised from the floor F. The locking device 20 has an actuating structure engaging and locking the striker 11 by the movement in which the striker 11 in the recess Ph is pushed in with the rising movement of the seat body 1.

Specifically, as illustrated in FIG. 6, the locking device 20 is constituted by a base plate 21 integrally coupled to the interior panel P, a latch 22 and a pawl 23 rotatably supported by and coupled to the base plate 21, a tension spring 24 hooked between the latch 22 and the pawl 23, and a release cable 25. The locking device 20 has a configuration of engaging and locking the latch 22 to the striker 11 when the striker 11 is pushed inside a receiving port 21A formed in the base plate 21.

Herein, two base plates 21 form a set, and components such as the latch 22 are assembled between both the plates. The latch 22 is then rotatably supported by and coupled to the base plate 21 by a supporting shaft 22E. The latch 22 is usually subjected to the biasing force of the tension spring 24 hooked between a hook portion 22C thereof and a hook portion 23C of the pawl 23, and is in a state of being rotated and biased in the counterclockwise direction in the figure, and is held in a postural state of an initial position where it contacts with a stopper 21 B formed on the base plate 21.

The latch 22 is provided with an upper jaw 22A that projects out into the mouth of the receiving port 21A formed in the base plate 21, and a lower jaw 22B (see FIG. 7) that moves so as to cover the receiving port 21A when the latch 22 rotates in a clockwise direction from the initial position in time of the postural state of the initial position. Further, the latch 22 is provided with a corner 22D that locks with a nail 23B formed in the pawl 23 when the latch 22 rotates in the clockwise direction from the initial position.

On the other hand, the pawl 23 is rotatably supported by and coupled to the base plate 21 by a supporting shaft 23E. The pawl 23 is usually subjected to the biasing force of the tension spring 24 hooked between the latch 22 and the pawl 23, as described above, and is in the state of being rotated and biased in the clockwise direction in the figure, and is held in a postural state of the initial position pressed against the corner 22D of the latch 22. The pawl 23 is provided with an operation arm 23A coupled to the right side end of the release cable 25 so as to be activated and operated, and the nail 23B which engages and locks to the corner 22D when the latch 22 rotates in the clockwise direction from the initial position.

Figure 7:
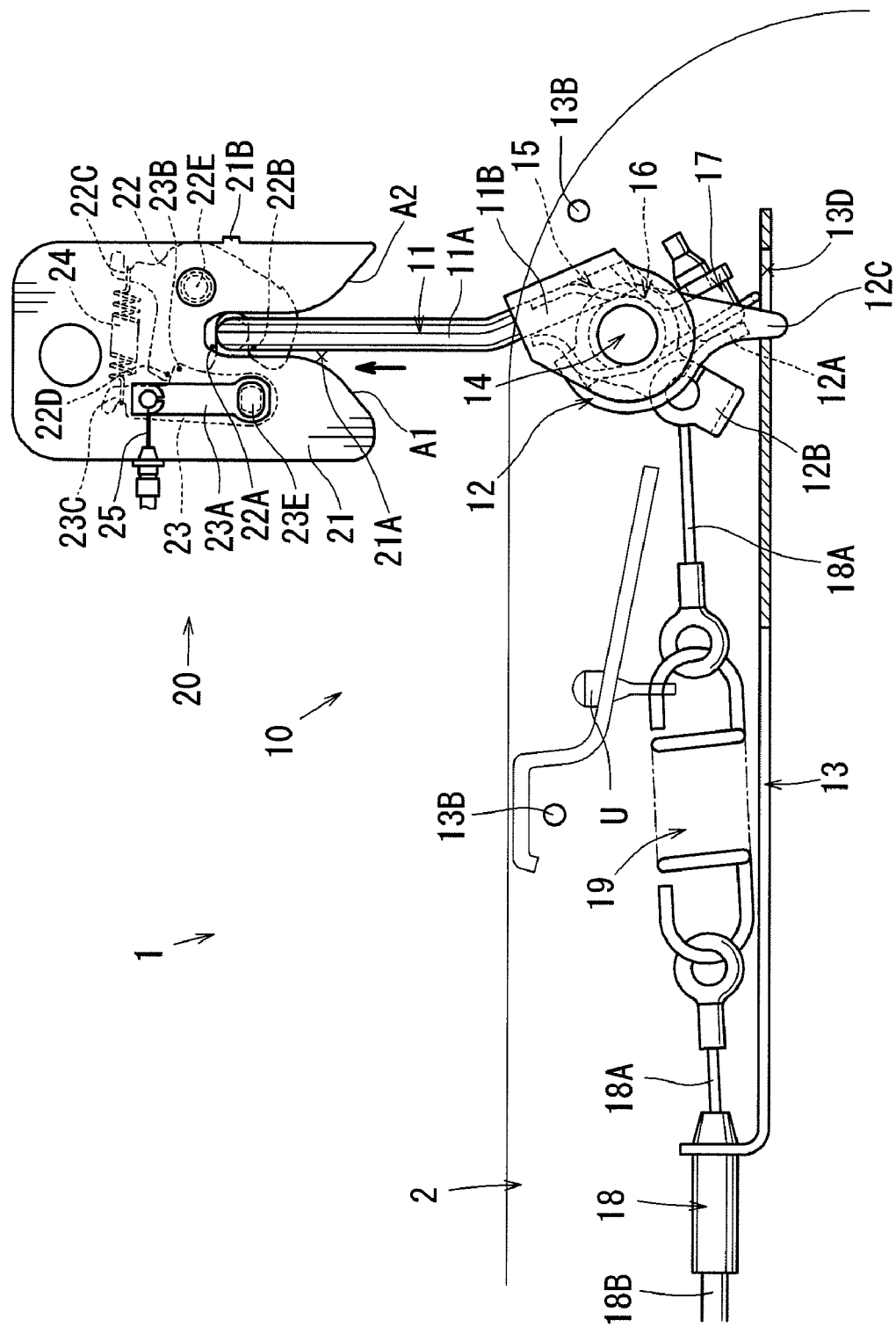
FIG. 7 is a configuration view illustrating a state in which the striker is engaged and locked to a locking device.

Referring back to FIG. 6, the locking device 20 of the above-mentioned configuration has the latch 22 with the upper jaw 22A exposing in the mouth of the base plate 21. The latch 22 is pushed and moved in the clockwise direction by the movement in which the striker 11 is pushed into the interior of the receiving port 21A of the base plate 21. Thus, as illustrated in FIG. 7, the rotation of the latch 22 is locked when the nail 23B of the pawl 23 is brought close to the corner 22D so as to be locked to each other by the biasing force of the tension spring 24. With the rotation in the clockwise direction, the lower jaw 22B moves so as to go around behind the striker 11, and closes the receiving port 21A. Thus, the striker 11 is held inside the receiving port 21A while being engaged and locked by the latch 22.

In other words, the locking device 20 of the above-mentioned configuration is in a lockable state in which it can engage and lock to the striker 11 by the push-in operation of the striker 11 before the release cable 25 is pulled. The engaging and locking state with the striker 11 is released by the pulling operation of the release cable 25. Here, although the illustration is omitted, the release cable 25 is coupled to an operation lever arranged on the vehicle body side wall, and is pulled by performing the release operation of the operation lever.

Therefore, when the release cable 25 is pulled, as illustrated in FIG. 6, the operation arm 23A is operated and the pawl 23 is rotationally operated in the counterclockwise direction. The locking state of the nail 23B of the pawl 23 and the corner 22D of the latch 22 is thus released, and the latch 22 rotates in the counterclockwise direction by the biasing force of the tension spring 24.

The striker 11 is then discharged from the receiving port 21A in a manner of being pushed out by the upper jaw 22A of the latch 22, whereby the engaged and locked state thereof is released. When the pulling operation of the release cable 25 is released, the pawl 23 is again pressed against the corner 22D of the latch 22, and the locking device 20 is returned to the lockable state at which it can again engage and lock to the striker 11.

Figure 9:
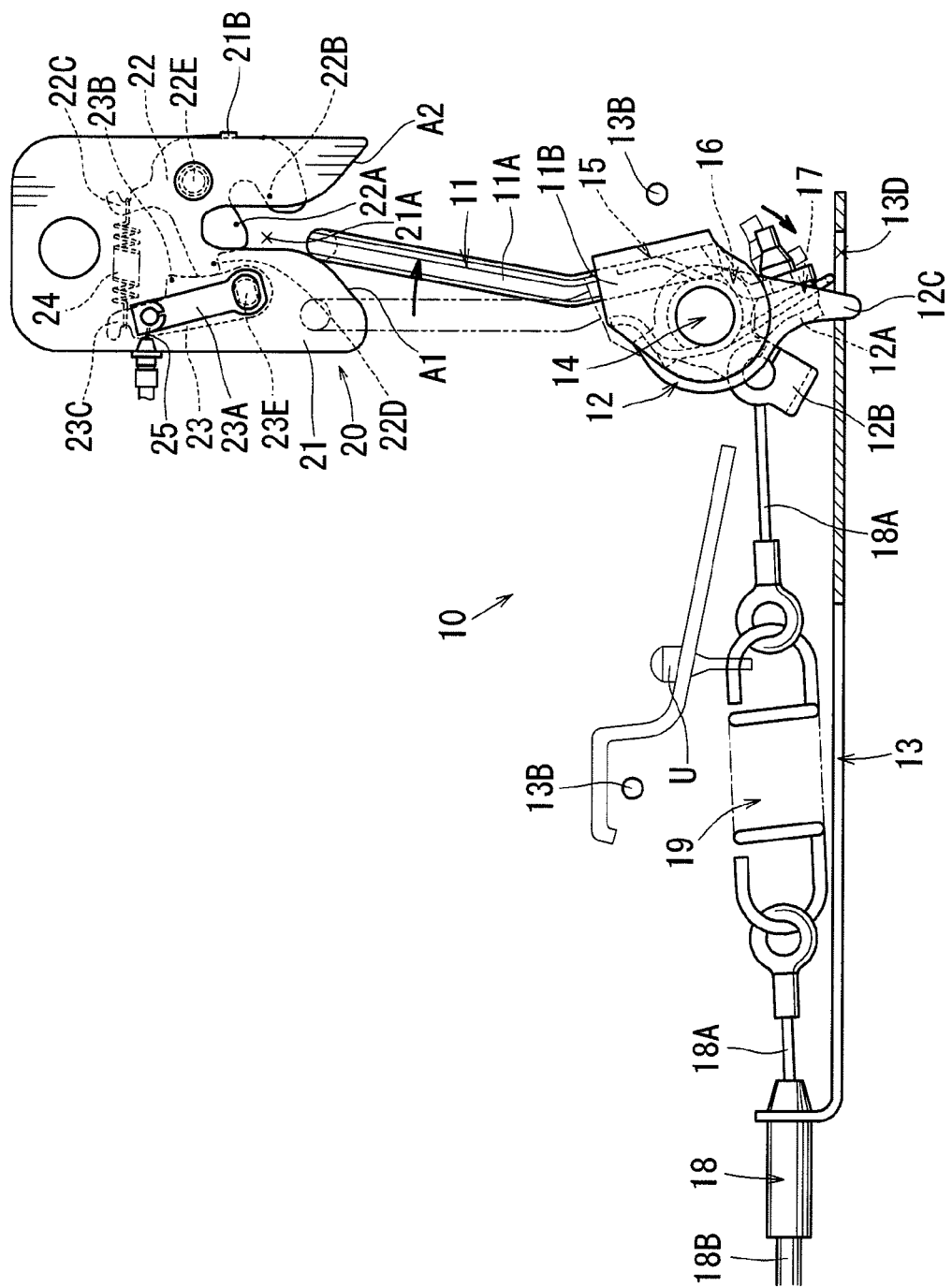
FIG. 9 is a configuration view illustrating a state in which the striker is moved and guided along an inclined surface on one side formed in a receiving port of the locking device.
Figure 10:
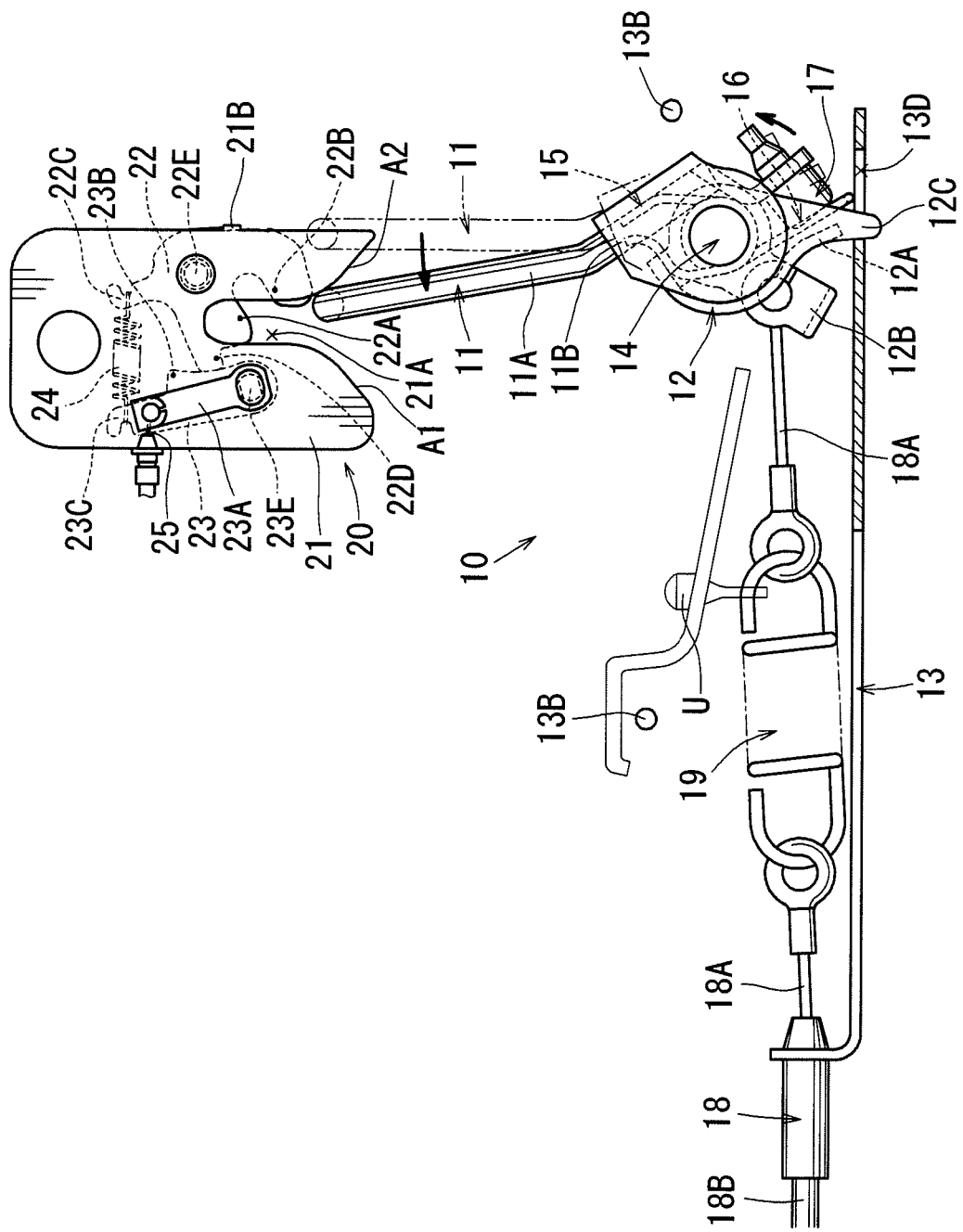
FIG. 10 is a configuration view illustrating a state in which the striker is moved and guided along an inclined surface on the other side formed in the receiving port of the locking device.

The locking device 20 of the above-mentioned configuration has the opening shape of the receiving port 21A formed to a shape that gradually widens in the opening direction so that the striker 11 can be easily received by the receiving port 21A. Thus, as illustrated in FIG. 9 and FIG. 10, even if a relative shift in a positional relationship occurs between the locking device 20 and the striker 11, the striker 11 is guided so as to move toward the interior of the receiving port 21A. The shift in the positional relationship described above may occur, for example, from the setting the seat body 1 on the floor or the momentum of when raising the seat body 1.

However, even if a relative shift in the positional relationship occurs with the locking device 20, the striker 11 can correct the positional shift by the rotational displacement in both forward and reverse directions involving elastic deformation of the rubber body 17 and the opening spring 15 described above. Specifically, as illustrated in FIG. 9, if the striker 11 is position-shifted to the left side in the figure with respect to the receiving port 21A of the locking device 20, the striker 11 contacts an inclined surface A1 forming a widening surface on the left side illustrated in the figure of the receiving port 21A when the seat body 1 is moved and stowed. The striker 11 is thereby moved and guided by the inclined surface A1, and is received into the interior of the receiving port 21A while being forcibly displaced in the clockwise direction illustrated in the figure in a manner of squashing the rubber body 17.

Further, as illustrated in FIG. 10, if the striker 11 is position-shifted to the right side illustrated in the figure with respect to the receiving port 21A of the locking device 20, the striker 11 contacts an inclined surface A2 forming the widening surface on the right side illustrated in the figure of the receiving port 21A when the seat body 1 is moved and stowed. The striker 11 is thereby moved and guided by the inclined surface A2, and is received into the interior of the receiving port 21A while being forcibly displaced in the counterclockwise direction illustrated in the figure in a manner of twisting the opening spring 15.

Thus, the position shift that occurs with the locking device 20 can be corrected by the rotational displacement of the striker 11, and hence the striker 11 can be reliably pushed in, and engaged and locked to the receiving port 21A of the locking device 20 by moving and stowing the seat body 1. The structure for correcting the shift of the push-in position described above effectively acts as a structure for absorbing the position shift that occurs by the influence of vibration and the like while the vehicle is traveling even when the striker 11 and the locking device 20 are engaged and locked.

The entire structure is simplified compared to a configuration in which the locking device 20 is raisably and rotatably provided by raisably and rotatably providing the striker 11 having a relatively simple configuration on the seat body 1. For instance, in order to configure the locking device 20 so as to be raisable and rotatable, a wide space for accommodating the same in the seat-shaped interior is required. A mechanism for raising or lowering and rotating the locking device 20 also becomes large scale.

The striker 11 is configured to be rotatably displaceable in both the forward and reverse directions from the rotated and raised position, and hence the range from the rotated and raised position of the striker 11 can be suppressed to be small by being allocated to both the forward and reverse directions. Therefore, the guiding width of the respective guiding surfaces (inclined surfaces A1, A2) set in the receiving port 21A of the locking device 20 also can be suppressed small. The position shift in both the forward and reverse directions that occurs between the striker 11 and the locking device 20 then can be corrected.

As described above, the embodiment of the present invention has been described using one embodiment, but the present invention can be implemented in various modes in addition to the above-described embodiment. For instance, a deformation allowing mechanism for allowing the rotational displacement in both the forward and reverse directions from the rotated and raised position of the striker, which is an engagement member, can be configured using one spring member. Specifically, a configuration in which a spring member is hooked between the striker and the coupling section, and the rotational displacement in both the forward and reverse directions with respect to the coupling section of the striker is allowed by the elastic deformation of the spring member may be adopted.

A configuration in which the striker is arranged on the vehicle body side and the locking device is raisably and rotatably arranged on the seat body side may be adopted. In this case, however, a wide accommodation space for accommodating the locking device to the shape of the rear surface portion of the seat back is required, and the mechanism for raisably rotating the locking device also becomes large scale. Further, the operation cable for raising and operating the locking device may get hooked to the locking device, thereby causing failure in the operation.

Further, the locking device that engages and locks to the striker may have a configuration of an electric operation type that detects the approaching movement of the striker and lock operates the same by electrical control.

The invention claimed is:

1. A lock structure for a stowable vehicle seat comprising:
a seat body;
a striker supported by and coupled to the seat body;
a lock device that engages the striker when the seat body is moved from a seating position to a stowed position;
an operation mechanism provided between the striker and an inner portion of the seat body configured to rotate the striker; and
a deformation allowing mechanism for allowing forward and reverse rotation of the striker;
wherein when the seat body is in the seating position, the striker is held at a lowered position along a shape of the seat body,
wherein when the seat body is moved to the stowed position, the striker is raised to and held at a rotated and raised position from the lowered position,
wherein when the operation mechanism is actuated, the seat body is moved to the stowed position such that the striker engages and locks to the lock device, and
wherein the deformation allowing mechanism includes:
a coupling section that is coupled to and rotatably supports the striker, and that is operably connected to the operation mechanism, and
an elastic body configured to hold the rotated and raised position of the striker and to allow the forward and reverse rotation of the striker.

2. The lock structure for a stowable vehicle as in claim 1, wherein
the elastic body includes a spring member biasing the striker in one rotating direction with respect to the coupling section.

3. The lock structure for a stowable vehicle as in claim 2, wherein an elastic stopper is provided between the striker and the coupling section, the coupling section being capable of elastically receiving a biasing rotation force of the striker by the spring member.

4. The lock structure for a stowable vehicle as in claim 3, wherein the rotation of the striker by the biasing rotation force of the spring member is regulated at the raised and rotated position by the elastic stopper, wherein the movement in one rotating direction of the striker is allowed by a deflecting deformation in which the elastic stopper is elastically deformed against the coupling section, and wherein the movement in another rotating direction of the striker is allowed by a deflecting deformation against the biasing rotational force of the spring member.

5. The lock structure for a stowable vehicle seat as in claim 4, wherein the striker is configured as a generally U-shaped frame.

6. The lock structure for a stowable vehicle as in claim 5, wherein the lock device includes an actuating structure which engages and locks to the striker such that the actuating structure receives therein the U-shaped frame when the seat body is moved into the stowed position.

7. The lock structure for a stowable vehicle seat as in claim 6, wherein the seat body is provided in a vehicle body and is configured to rotate upward from a vehicle floor in the seating position toward a side of the vehicle body to be engaged and locked to and held at a vehicle body side wall panel in the stowed position.

* * * * *

UNITED STATES PATENT AND TRADEMARK OFFICE
CERTIFICATE OF CORRECTION

| | | |
|---|---|---|
| PATENT NO. | : 7,954,873 B2 | |
| APPLICATION NO. | : 12/527740 | |
| DATED | : June 7, 2011 | |
| INVENTOR(S) | : Tetsuya Abe et al. | |

It is certified that error appears in the above-identified patent and that said Letters Patent is hereby corrected as shown below:

On the cover page, References Cited (56), Other Publications, please delete duplicate entry for "Search report from E.P.O., mail date is Jan. 11, 2011".

Signed and Sealed this
Tenth Day of January, 2012

David J. Kappos
*Director of the United States Patent and Trademark Office*